Oct. 15, 1957

L. P. GARVEY ET AL 2,809,689

SEAT ADJUSTER

Filed Dec. 2, 1953

Inventors
Louis P. Garvey,
Claud S. Semar &
Akira Tanaka
BY
Paul Fitzpatrick
Attorneys

Oct. 15, 1957   L. P. GARVEY ET AL   2,809,689
SEAT ADJUSTER
Filed Dec. 2, 1953   8 Sheets-Sheet 4

Inventors
*Louis P. Garvey,*
*Claud S. Semar, &*
*Akira Tanaka*
BY
*Paul Fitzpatrick*
Attorneys Oct. 15, 1957 L. P. GARVEY ET AL 2,809,689
SEAT ADJUSTER
Filed Dec. 2, 1953 8 Sheets-Sheet 6

Inventors
*Louis P. Garvey,*
*Claud S. Semar, &*
*Akira Tanaka*
BY *Paul Fitzpatrick*
Attorneys

United States Patent Office 2,809,689
Patented Oct. 15, 1957

2,809,689

SEAT ADJUSTER

Louis P. Garvey, Detroit, Claud S. Semar, Birmingham, and Akira Tanaka, Detroit, Mich., assignors to General Motors Corporation, Detroit, Mich., a corporation of Delaware Application December 2, 1953, Serial No. 395,822

6 Claims. (Cl. 155—14)

This invention relates to an automobile seat, and more particularly to a vertically movable seat.

One feature of the invention is that it provides a seat which is movable in response to tilting movement of the seat back and which is also adjustable vertically; another feature of the invention is that it provides a seat which is adjustable in a fore and aft direction, which is movable in response to tilting movement of the seat back, and which is adjustable vertically; still another feature of the invention is that it provides improved vertical adjusting means; a further feature of the invention is that the vertical adjusting means comprises a plurality of links supporting the means for moving the frame in response to tilting movement of the seat back, motor means and crank means connecting the motor means and the links; still another feature of the invention is that it provides means interconnecting the front and rear portions of the vertical adjusting means to synchronize vertical movement of the front and rear sides of the seat; and yet a further feature of the invention is that means are provided interconnecting opposite ends of the seat to insure aligned vertical adjustment.

Other features and advantages of the invention will be apparent from the following description and from the drawings, in which:

Fig. 1 is a fragmentary end elevation of a seat including the invention in one form;

Automobile seats for many years have incorporated a fore and aft adjusting means for the front seat, and in recent years some seats have been further refined to include a vertical adjusting means. Figs. 1–4 illustrate a novel, simple vertical adjustment means in combination with a conventional type of fore and aft adjustment means. The vertical adjustment means includes only a few parts so that it is particularly well adapted for mass production manufacture and is easily fitted into existing automobile structures, and since the vertical adjustment means carries the horizontal adjusting means, it may be fitted into existing automobile structures without extensive modifications. Despite its simplicity and small number of parts, the vertical adjustment means includes interconnections between the front and back sides of the seat and interconnections between opposite ends of the seat to provide for properly aligned operation of front and rear sides of the seat at both ends thereof.

In two-door automobiles, a pair of seat backs are arranged in side by side relationship, and either seat back may be tilted forwardly to facilitate ingress to and egress from the rear seat of the automobile. Recently an improved seat has been developed wherein the seat frame swings forwardly in response to tilting movement of the seat back, one end of the seat pivoting about an axis adjacent the opposite rear corner of the seat. A seat of this type is disclosed in the co-pending application of Clyde H. Schamel and Claud S. Semar, filed November 18, 1952, as Serial No. 321,169. Figs. 5–8 illustrate an improved seat in which a vertical adjustment means has been incorporated in combination with fore and aft adjustment means and with means for moving the seat in response to tilting of the seat back. Thus, in this improved seat, means are provided for adjusting the seat in a fore and aft direction, for swinging the seat in response to tilting movement of the seat back and for adjusting the seat vertically.

Referring now more particularly to the drawings, Figs. 1–4 show a form of seat which may be used in a sedan or four-door automobile body, the seat incorporating fore and aft adjustment means in combination with vertical adjustment means. The structure is identical at opposite ends of the seat, and, therefore, the structure at one end only will be described. The seat comprises a seat cushion 10 and a seat back 12 mounted on a frame 14. The frame 14 is bolted to an inverted channel member 16 which is slidably mounted on a supporting lower channel member 18, anti-friction means similar to those shown in Fig. 8 being employed to give sliding movement of the inverted channel 16 without undesired side motion. Member 18 comprises a U-shaped channel portion and a support portion which are bolted together to form a unitary member.

In constructions which were formerly used, the lower channel member 18 was bolted directly to the floor 20 of the automobile. According to the present invention, a vertical adjustment means is interposed between the lower channel member 18 and the floor 20 of the automobile. This means includes a floor support member 22 which is bolted to the floor 20 and which has a mounting yoke 24 at the front and a mounting yoke 26 at the back end. At the front a support link 28 is pivoted at its rear end on a pin 30 in the yoke 24. The forward end of the link is articulated to the lower channel member 18 by means of a pin 32. The structure at the rear is similar, a link 34 being pivoted on a pin 36 in yoke 26 and being pivoted on a pin 38 to the channel member 18.

The structure at the opposite end of the seat is similar, there being a corresponding inverted channel member 16 which supports the seat frame and which is slidably mounted upon a lower support channel 18 which is mounted by means of links 28 and 34 to a floor support bracket for vertical movement.

Figure 6:
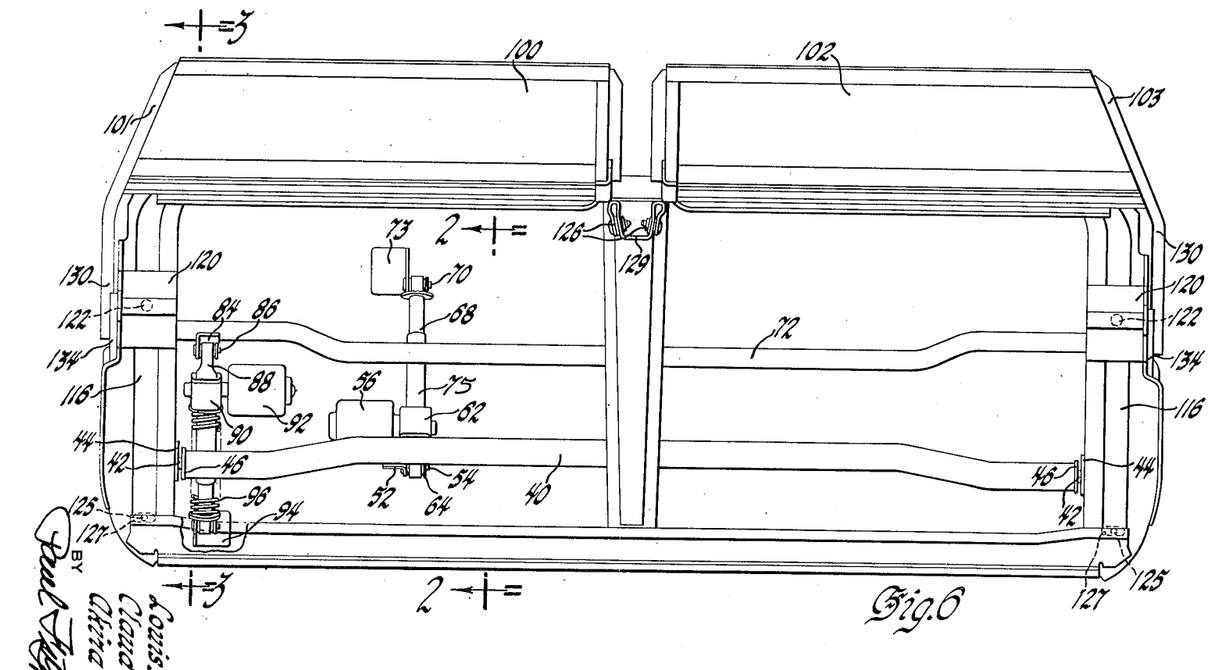
Fig. 6 is a plan view of the seat assembly of Fig. 5 as seen from below, this view also including parts which are common to both forms of the invention.

A connecting crank bar 40 extends between opposite ends of the seat below the seat frame. At each end of this bar is a pin 42 (Figs. 1 and 6) which is journaled through an opening in an upstanding flange 44 projecting from the slidable channel member 16. Welded to the bar 40 at each end thereof is a crank arm 46 which is pivotally connected at its lower end to a link 48, the other end of the link being pivotally connected to an upstanding flange 50 on the floor support 22. As shown in Fig. 6, bar 40 is formed as a double-ended crank, being offset in its center portion, and a bracket 52 is welded to bar 40 in the offset portion thereof and carries a pin 54. The connection of arms 46 with link 48 permits arms 46 to move vertically when the bar 40 rotates and moves horizontally. At the same time, arms 46 hold opposite ends of bar 40 at the proper fore and aft location and prevent cocking of the seat.

A reversible electric motor 56 has its drive shaft 58 coupled to a gear 59 on a screw jack shaft 60 which is mounted in a gear housing 62. A support bracket 64 is pivotally mounted on the pin 54 and is bolted to the gear housing 62 by means of bolts 66 so that the motor 56 and the gear housing 62 are suspended from the bar 40. The screw jack shaft 60 meshes with an internally threaded shaft 69 which is articulated at 70 to a support bracket 73 mounted on the automobile floor 20, and a protective sheath 75 projects from the gear housing to keep dust out of the screw jack. Motor 56 may be connected through a conventional reversing switch arrangement to the electrical system of the automobile so that the seat can be adjusted in a fore and aft direction as desired. If desired, the motor means may be connected directly to the seat frame 14 instead of to bar 40. This latter construction would minimize chuck or side motion of the seat.

In order to adjust the seat vertically, a crank bar 72 extends between opposite sides of the seat and is connected to the vertical adjusting mechanism at opposite ends of the seat. At each end of the seat a crank 74 is welded to or otherwise immovably connected to the bar 72, this crank being pivotally connected at the lower end to pin 36 on yoke 26 and being connected to pin 38 on the channel member 18 so that crank 74 is effectively integral with the rear vertical adjustment link 34. A link 76 is connected between the crank 74 and a similar crank member 78 which is effectively integral with front adjustment link 28, being pivoted at one end on the floor support pin 30 and being connected at the other end on the pin 32 carried on the member 18. The link 76 is pivotally connected between crank members 78 and 74 by means of pins 80 and 82 so that the front and rear vertical adjustment links 28 and 34 are interconnected, insuring that the front and rear sides of the seat operate together during vertical adjustment.

In order to drive the connecting bar 72, a support bracket 84 is welded thereto adjacent one end of the bar (Fig. 6) and a pin 86 on this bracket pivotally supports a bracket 88 which is bolted to a gear housing 90 carrying a reversible motor 92 connected to a screw jack assembly which is similar to the screw jack assembly used for fore and aft adjustment. The lower end of the screw jack assembly is connected to a floor bracket 94 and a heavy spring 96 is carried under compression on the screw jack assembly for assisting in raising the seat and for providing a load when the seat is being lowered to prevent excessive coasting of the motor at the end of the lowering cycle.

The vertical adjustment drive motor 92 may be connected through a reversing switch to the electrical system of the automobile so that the seat may be adjusted vertically at will. The front crank 78 has a projecting stop foot 98 which rests on the base of the floor support bracket 22 when the seat is in its raised position. Operation of the motor 92 to raise the seat will rotate bar 72 and crank 74 in a clockwise direction as the parts appear in Figs. 2, 3 and 4 so that links 28 and 34 are also pivoted in a clockwise direction about the axes of their respective floor mounting pins 30 and 36, causing the seat to move upwardly and rearwardly, the forward link 28 being driven through the interconnecting link 76.

The structure described above provides a simple and efficient vertical adjusting means for an automobile seat which may be readily incorporated in combination with independently operable fore and aft adjusting means.

In the modified form shown in Figs. 5, 6, 7 and 8, the seat is adjustable in a fore and aft direction, and either end of the seat is swingable forwardly in response to tilting movement of the adjacent seat back to facilitate ingress to and egress from the back seat of the automobile, as shown and described in detail in application Serial No. 321,169 identified above. Many of the parts in this modified form are common in structure and function with parts in the embodiment of Figs. 1-4, and these parts are identified by the same reference characters that were used in Figs. 1-4.

A vertical adjusting means has been added in combination with the fore and aft adjustment and the swingable moving means. The seat shown in Figs. 5-8 comprises a seat cushion 10 which is similar to the seat cushion in Figs. 1-4, and a pair of tiltable seat backs 100 and 102 which are arranged in side by side relation as shown in Fig. 6. The seat is carried on a frame 14 and each of the tiltable seat back is carried on a subframe, seat back 100 being carried on subframe 101 and seat back 102 being carried on subframe 103.

Since the fore and aft adjusting means and the swingable means are fully described in application Serial No. 321,169, they will not be described in great detail here, and the description of these parts of the seat will be in rather general terms, although a completely operable structure will be described.

In Figs. 5–8, the inverted channel member 116, which is similar to the member 16 of Figs. 1-4, is utilized for swinging either side of the seat in response to tilting movement of the adjacent seat back rather than for fore and aft adjustment, as in Figs. 1-4. The seat frame 14 is mounted on this inverted channel member for limited pivotal movement thereon, the rear side of the seat frame being connected to the member 116 at opposite ends of the seat by means of support brackets 120 rigidly bolted to the seat frame 14 and pivotally supported on vertical trunnions 122 (Fig. 6) on member 116. This mounting permits either end of the seat to pivot about an axis 122 adjacent the opposite rear corner of the seat, and one of the pivotal connections between the seat support bracket 120 and the inverted channel member 116 preferably is so formed as to permit some sideward movement of the seat to prevent binding during pivotal movement of the opposite end of the seat. The front side of the seat frame is mounted on the inverted channel member 116 through support brackets 124, there being one of these brackets at each opposite end of the seat, and the connections between each bracket 124 and the inverted channel mmeber 116 being made by means of a bolt 125 on bracket 124 and an elongated slot 127 in member 116 (Figs. 6 and 8) to permit limited arcuate swinging movement of the seat frame and simultaneous rectilinear movement of the inverted channel member 116.

Figure 2:
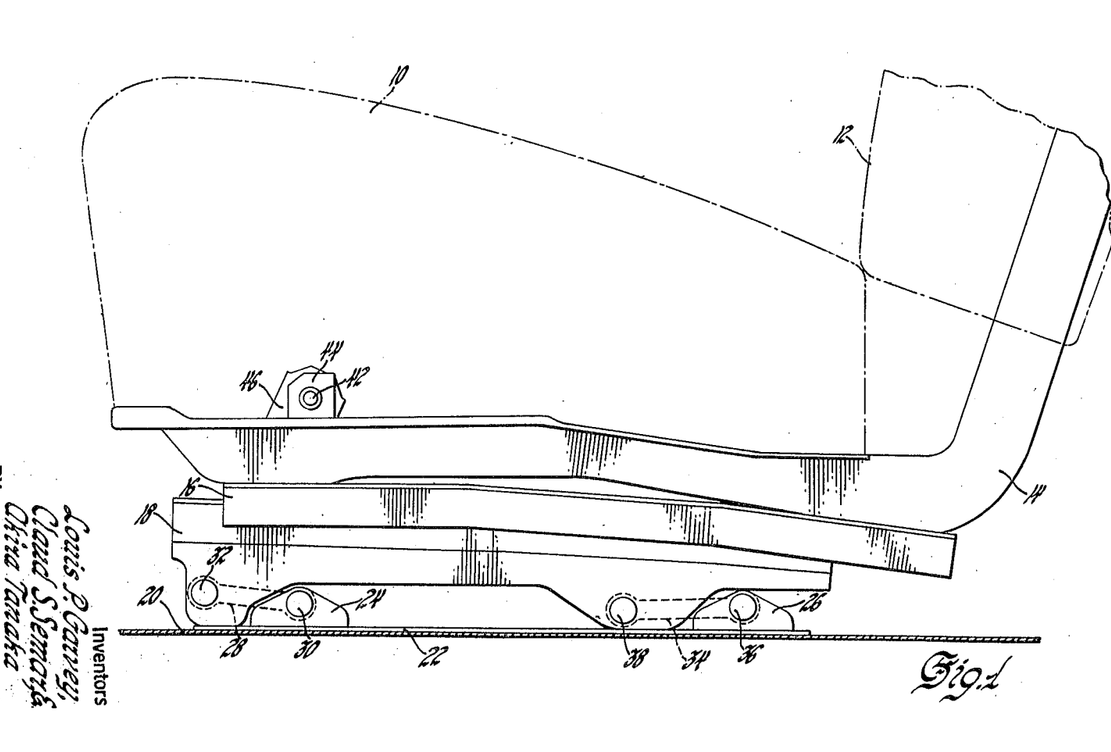
Fig. 2 is an enlarged transverse section through the seat of Fig. 1 taken along the line 2—2 of Fig. 6 and showing the motor means through which vertical and fore and aft adjustments are made.
Figure 3:
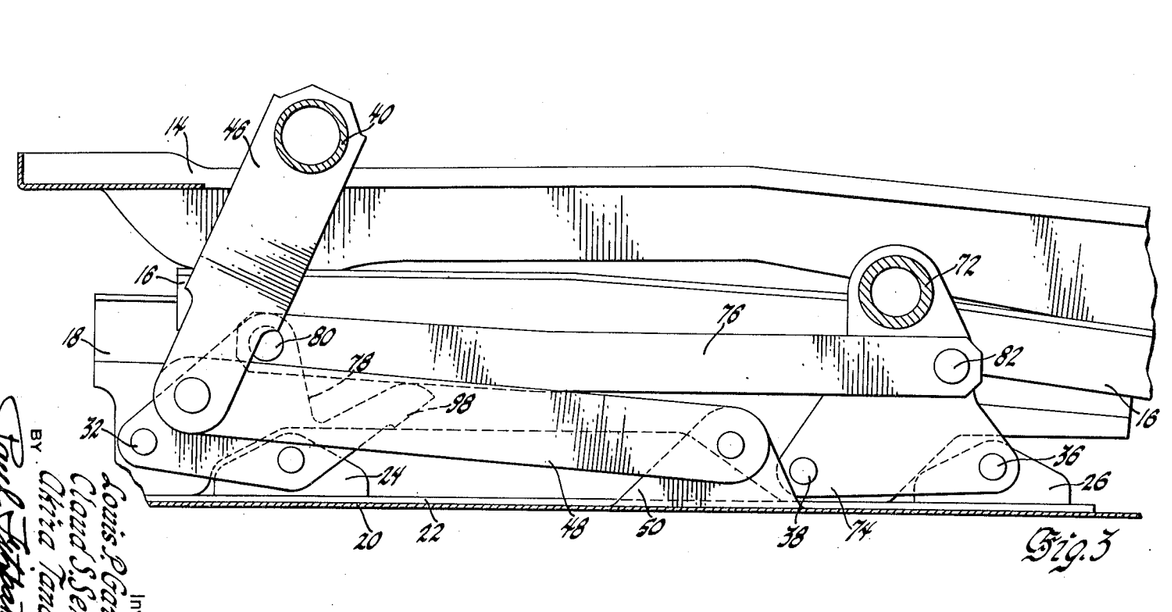
Fig. 3 is a transverse section through the seat of Fig. 1 taken along the line 3—3 of Fig. 6 and showing the vertical adjusting apparatus, the seat being in its lowered position.
Figure 4:
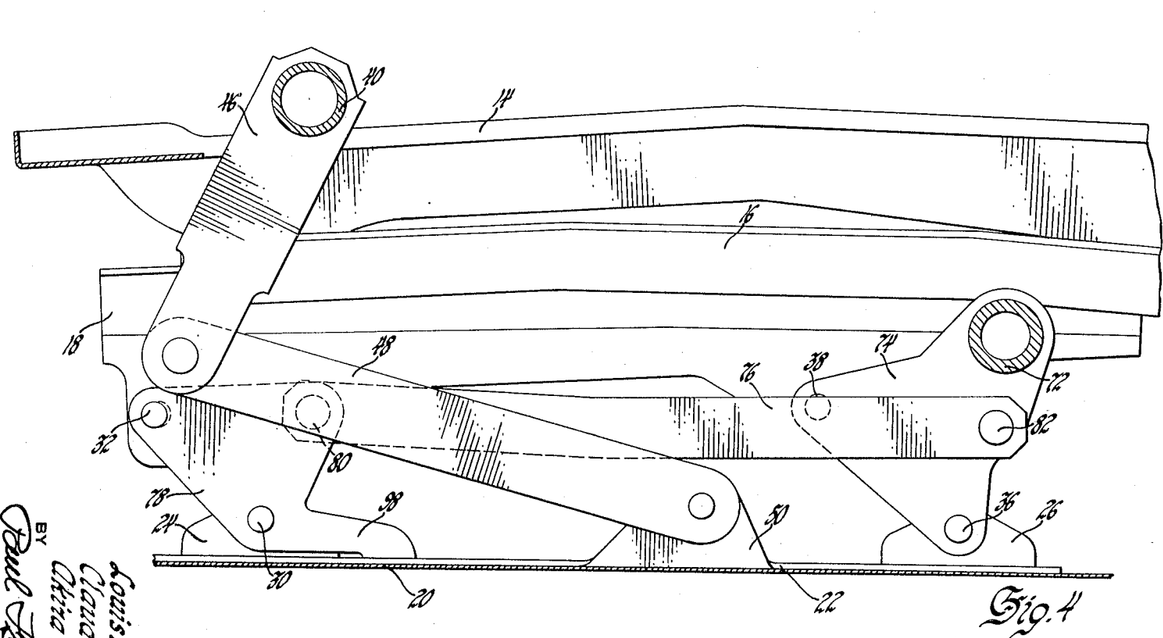
Fig. 4 is a section similar to Fig. 3, but with the seat in its raised position.
Figure 5:
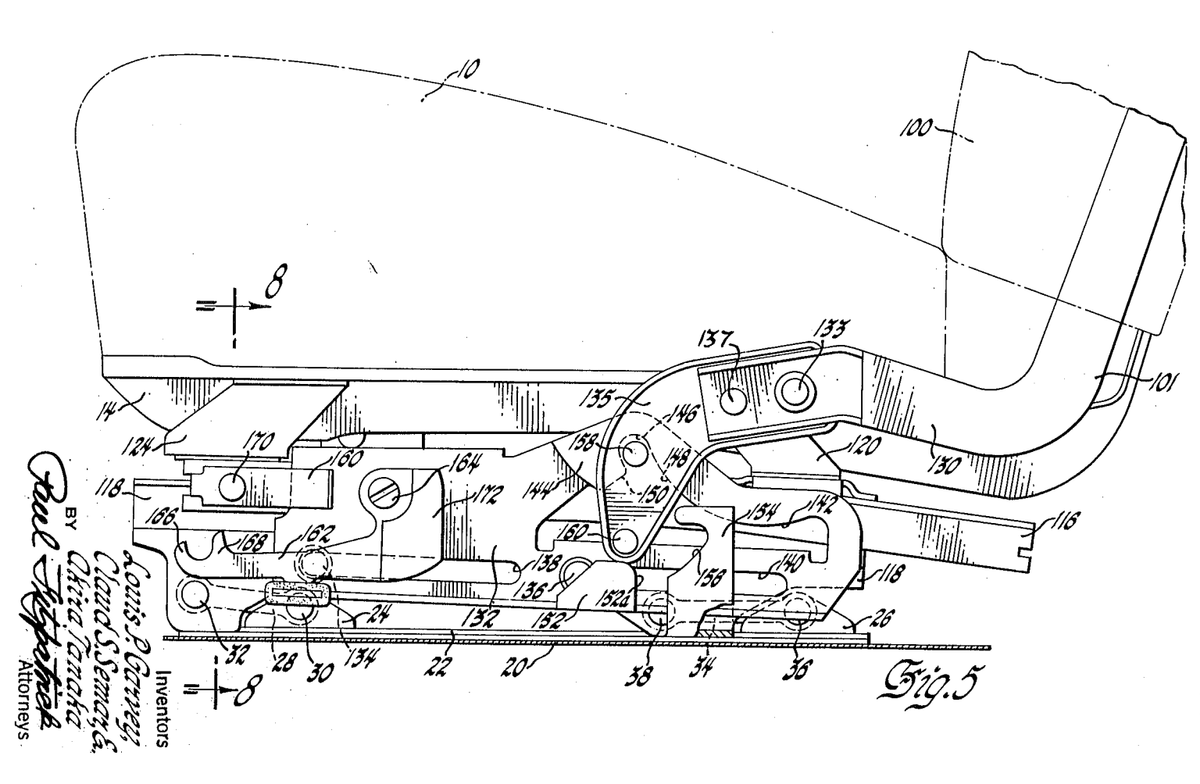
Fig. 5 is a fragmentary side elevational view of a modified form of the invention which includes fore and aft adjustment, vertical adjustment, and seat movement in response to tilting of the seat back.

Each seat back 100 and 102 is mounted for tilting movement forwardly and inwardly about an inclined axis. Adjacent the center of the seat back 100 the subframe 101 which carries said seat back is pivotally connected to the main seat frame 14 at 126, and the seat back 102 is similarly connected as shown in Fig. 6, a mounting bracket 129 providing these connections between each seat back frame and the main seat frame 14. At each other side of the seat each subframe has an L-shaped forwardly extending portion 130 which is pivotally mounted on a horizontal trunnion 133 located substantially in the vertical plane of the pivotal mounting points 122, being forwardly of the pivotal mounting points 126 which connect the inner end of each seat back to the main seat frame. Consequently, each seat back is mounted on the main seat frame 14 for pivotal movement forwardly and inwardly of the seat. As shown in Fig. 5, a forwardly projecting extension 135 is carried on the seat back subframe extending portion 130 and is pivotally movable about the axis of trunnion 133. However, extension 135 must move through an arc in a plane parallel to the side of the inverted channel member 116, that is, in a plane parallel to the plane of the paper in Fig. 5 while frame extension 130 pivots about an inclined axis. Extension 135 is connected to subframe 101 through the trunnion 133 and also through a pin 137 so that extension 135 may move with reference to subframe 101 in directions longitudinal of trunnion 133 and pin 136. Subframe 101 carries extension 135 with it insofar as pivotal movement about trunnion 133 is concerned.

The seat back subframe is carried on inverted channel member 116, and extension 135 has a driving connection with the fore and aft adjustment means, as will be hereinafter described, so that when one of the tiltable seat backs is tilted forwardly, the inverted channel 116 on that side of the seat will also move forwardly to swing the seat frame 14 about the axis 122 adjacent the opposite rear corner of the seat, the amount of forward movement of the channel 116 depending upon the fore and aft adjusted position of the seat.

The fore and aft adjustment means for the seat is formed by means of fore and aft adjustment brackets 132 at each opposite side of the seat, these brackets being slidably mounted on a channel member 118 which is similar to channel member 18 of Figs. 1–4 and along which the inverted channel member 116 may slide. Antifriction means preferably are provided between inverted channel member 116 and lower channel member 118 to facilitate sliding movement without objectionable rattling.

In this form of the invention, studs 134 and 136 project outwardly from channel member 118 and enter slots 138 and 140 formed in fore and aft support bracket 132 so that this bracket is slidably mounted on the channel member 118. Fore and aft support bracket 132 is provided with a generally triangularly shaped cutout 142, the upper portion of which is formed by an overhang portion 144 having a forwardly and upwardly extending slot 146. At the forward side of the slot the overhang 144 is cut away to provide an abutment surface 150. Below the overhang portion 144 an upwardly extending flange 152 projects from the fore and aft adjustment member 132, and rearwardly of slot 146 and flange 152 is an upwardly projecting flange 154 on the channel member 118. This latter flange is provided with a notch 156.

In order to form a driving connection whereby extension 135 on the seat back frame 101 drives inverted channel member 116 forwardly in response to tilting movement of the seat back, studs 158 and 160 project from the surface of extension 135 and are adapted to cooperate with the overhang portion 144, the flange 152 and the flange 154 of channel member 118. Engagement of pin 158 in slot 146 provides an interconnection between fore and aft adjustment bracket 132 and inverted channel 116, so that normally channel 116 and the seat frame are carried by bracket 132 during fore and aft adjustment.

Fig. 5 shows the seat in its normal position when seat back 100 is substantially vertical. If the seat back 100 is tilted forwardly about the axis extending between pin 126 and trunnion 133, frame extension 135 will move pivotally in a counterclockwise direction about the axis of trunnion 133, the loose connection between this extension and the subframe 101 permitting the extension 135 to swing in the plane of the paper as the parts appear in Fig. 5. During the first part of this swinging movement, stud 158 will move out of slot 146 to disconnect inverted channel 116 from fore and aft bracket 132, and stud 160 will move toward notch 156 on flange 154. The initial distance between stud 160 and the base of notch 156 depends upon the fore and aft adjusted position of the seat; that is, when the seat is adjusted in its most rearward position, stud 160 will be quite close to notch 156 when the seat back is in its normal substantially vertical position. However, when the seat is adjusted forwardly, stud 160 will be spaced farther from notch 156 when the seat back is in its normal substantially vertical position. Since the inverted channel 116 is cammed forwardly by tilting movement of subframe 101 when pin 160 abuts the flange 154, the amount of forward swinging movement of the seat frame in response to tilting movement of the seat back is dependent upon the adjusted fore and aft position of the seat.

Therefore, when the seat back is tilted, there will be some lost motion depending in amount on the fore and aft adjusted position of the seat. When stud 160 enters notch 156 and abuts flange 154, further tilting movement of the seat back 100 drives the inverted channel member 116 (which carries the seat frame 14) forwardly. At this time, stud 158 has moved out of slot 146 so there is no interconnection between the seat frame and the fore and aft adjusting bracket 132, and one end of the seat frame 14 may swing about the trunnion 122 adjacent the opposite rear corner of the seat because of the pin and slot connections 125, 127, above described, the loosely fitting trunnion 122 preventing binding at the rear of the seat.

When the seat back 100 is swung back toward its normal substantially vertical position, stud 160 on the frame extension 135 pivots through an arc in a clockwise direction and abuts the rearwardly facing surface 152a of flange 152 which is integral with fore and aft adjusting bracket 132, so that the inverted channel member 116 which carries the seat frame is cammed back toward its original position. As the seat back approaches its normal substantially vertical position, stud 160 moves up away from the abutting surface 152a of the camming flange as shown in Fig. 5 and the last portion of the drive is accomplished by engagement of stud 158 on abutment surface 150 of the overhang portion 144 of the fore and aft adjusting bracket 132. As the seat back 100 reaches its normal substantially vertical position, stud 158 re-enters slot 146 to provide an interlock between the seat frame and the fore and aft adjusting bracket 132.

At the front side of the seat a heavy spring clip 160 is riveted to the inverted channel member 116 to clamp the front edge of fore and aft adjustment bracket 132 against inverted channel member 116 and control alignment of members 116 and 132.

In order to provide against undesired swinging movement of the seat in response to tilting movement of the seat back in the event of a sudden stop, an inertia latch is mounted on the seat. This latch comprises a latch member 162 pivotally mounted on a pin 164 which projects from fore and aft adjustment bracket 132. At its free end the latch 162 has upwardly projecting spaced fingers 166 and 168, and a pin 170 projects outwardly from the forward end of inverted channel member 116 for engagement by the latch member 162 in the event of a sudden stop. One or more weights 172 are attached to the rear end of latch 162 to hold the latch balanced under normal operating conditions, and to permit the latch to swing in a clockwise direction about the axis of stud 164 in the event of a sudden stop.

In this seat the vertical adjustment means is similar to the vertical adjustment means shown in Figs. 1–4, and, therefore, similar reference characters will be used in the description.

A floor support bracket 22 has a front yoke 24 and a rear yoke 26, a front link 28 being pivoted on a pin 30 on the front yoke 24 and a pin 32 pivotally connecting the front end of link 28 to the channel member 118. At the rear end link 34 is pivoted on a pin 36 on the yoke 26 and the forward end of the link is pivoted on a pin 38 on the channel member 118.

The drive apparatus for fore and aft and vertical adjustment is similar to that which has already been described in connection with the embodiment of the invention illustrated in Figs. 1–4. Fore and aft adjustment is obtained through a bar 40 which interconnects opposite sides of the seat and which is connected at 42 to a flange 44 projecting from the fore and aft adjustment bracket 132. A crank 46 integral with bar 40 is connected at its lower end to a link 48, the other end of which is pivoted to a flange 50 on the floor support bracket and motor means are provided for driving crank bar 40. As earlier described, the drive apparatus includes a connecting bracket 52 welded to an offset crank portion of bar 40 and having a pin 54, and a reversible electric motor 56 is mounted on a gear housing 62 which has a supporting bracket 64 carried on pin 54. A screw jack assembly, as shown in Figs. 6 and 7, is connected between the automobile floor and the crank bar 40, and reversing switch means may be provided in the connections between the motor and the automobile electrical system for fore and aft adjustment.

Figure 7:
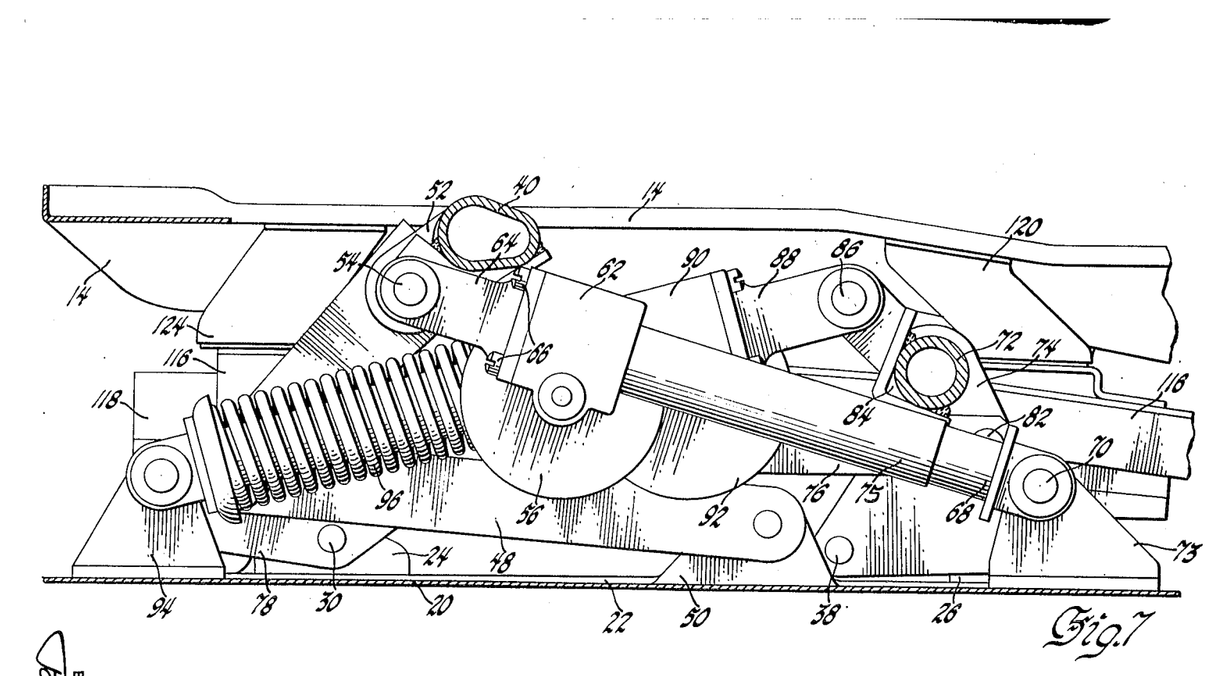
Fig. 7 is a transverse section through the seat apparatus of Fig. 5.
Figure 8:
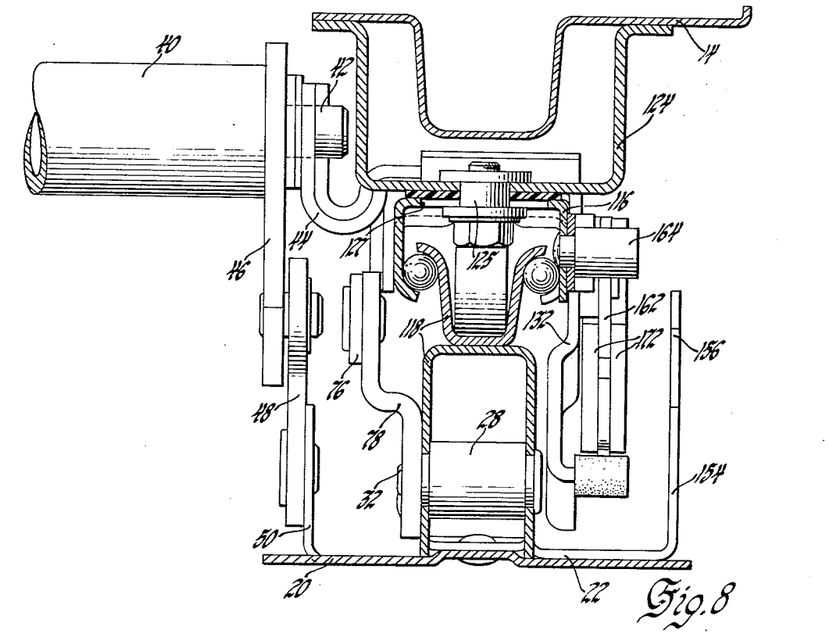
Fig. 8 is a section taken along the line 8—8 of Fig. 5.

Vertical adjustment is identical to that described in connection with Figs. 1–4 and is shown in Figs. 6 and 7. A connecting bar 72 extends underneath the seat and interconnects opposite ends thereof. A mounting bracket 84 is welded to this bar and has a pin 86 pivotally connecting a gear housing 90 and reversible electric motor 92, and a screw jack assembly is operated by the motor and is connected between bar 72 and a floor support bracket 94.

While we have shown and described two embodiments of our invention, it is capable of many modifications. Changes, therefore, in the construction and arrangement may be made without departing from the spirit and scope of the invention as set forth in the appended claims.

We claim:

1. In an automobile, apparatus of the character described, including: a seat comprising a seat cushion and a pair of tiltable seat backs; a frame supporting said seat cushion and backs; means for adjusting said frame rectilinearly in a fore and aft direction; means for swinging either side of said frame in response to tilting movement of the one of said seat backs adjacent the side of said frame which is to be swung; and means for adjusting said frame vertically.

2. In an automobile, apparatus of the character described, including: a seat comprising a seat cushion and a pair of tiltable seat backs arranged in side by side relation; a frame supporting said seat cushion and backs; means including a motor for moving said frame rectilinearly in a fore and aft direction; means for swinging either side of said frame forwardly in response to tilting movement of the one of said seat backs adjacent the side of said frame which is to be swung; and means for moving said frame vertically.

3. In an automobile, apparatus of the character described, including: a seat comprising a seat cushion and a pair of tiltable seat backs arranged in side by side relation along the rear side of said cushion; a frame supporting said seat cushion and backs; means for moving said frame rectilinearly in a fore and aft direction; means for pivoting either side of said frame forwardly and inwardly about an axis adjacent the rear corner opposite the side of said frame to be pivoted in response to tilting movement of the one of said seat backs adjacent the side of said frame which is to be pivoted; and means for moving said frame vertically.

4. In an automobile, apparatus of the character described, including: a seat comprising a seat cushion and a pair of tiltable seat backs arranged in side by side relation along the rear side of said cushion; a frame supporting said seat cushion and backs; means for pivoting either side of said frame forwardly and inwardly about an axis adjacent the rear corner opposite of the side of said frame to be pivoted in response to tilting movement of the one of said seat backs adjacent the side of said frame which is to be pivoted; and means including a motor for moving said frame vertically.

5. In an automobile, apparatus of the character described, including: a seat comprising a seat cushion and a pair of tiltable seat backs arranged in side by side relationship along the rear side of said cushion, each seat back being movable between a substantially vertical position and a forwardly tilted position; a frame supporting said seat cushion and backs; means for pivoting either side of said frame forwardly and inwardly about an axis adjacent the rear corner opposite the side of said frame to be pivoted in response to tilting movement of the one of said seat backs adjacent the side of said frame which is to be pivoted; means for restraining either side of said frame against pivotal movement when the one of said seat backs adjacent the side of frame to be restrained is in its substantially vertical position; and means for adjusting said frame vertically.

6. In an automobile, apparatus of the character described, including: a seat comprising a seat cushion and a pair of tiltable seat backs arranged in side by side relationship along the rear side of said cushion, each seat back being movable between a substantially vertical position and a forwardly tilted position; a frame supporting said seat cushion and backs; means for adjusting said frame in a fore and aft direction; means for pivoting either side of said frame forwardly and inwardly about an axis adjacent the rear corner opposite the side of said frame to be pivoted in response to tilting movement of the one of said seat backs adjacent the side of said frame which is to be pivoted; means for restraining either side of said frame against pivotal movement when the one of said seat backs adjacent the side of the frame to be restrained is in its substantially vertical position; and means for adjusting said frame vertically.

References Cited in the file of this patent

UNITED STATES PATENTS

| | | |
|---|---|---|
| 2,111,519 | Whedon et al. | Mar. 15, 1938 |
| 2,189,396 | Greig | Feb. 6, 1940 |
| 2,219,456 | Saunders et al. | Oct. 29, 1940 |
| 2,260,032 | Kaiser et al. | Oct. 21, 1941 |
| 2,428,217 | Hedley et al. | Sept. 30, 1947 |
| 2,596,033 | King | May 6, 1952 |
| 2,618,312 | Bradley | Nov. 18, 1952 |
| 2,641,305 | Oishei | June 9, 1953 |
| 2,660,223 | Appleton | Nov. 24, 1953 |
| 2,725,921 | Markin | Dec. 6, 1955 |

FOREIGN PATENTS

| | | |
|---|---|---|
| 172,163 | Great Britain | Dec. 8, 1921 |